United States Patent
Francke et al.

(10) Patent No.: US 8,567,343 B2
(45) Date of Patent: Oct. 29, 2013

(54) METHOD FOR EXTRACTING MILK AND DETERMINING A GROUP MILK YIELD BASED UPON A SUBGROUP MILK YIELD

(75) Inventors: Heinz Francke, Oelde (DE); Bernhard Schulze Wartenhorst, Warendorf (DE); Andreas Forster, Beckum (DE); Peter Maguire, Darraweit Guim (AU)

(73) Assignee: GEA Farm Technologies GmbH, Bönen (DE)

( * ) Notice: Subject to any disclaimer, the term of this patent is extended or adjusted under 35 U.S.C. 154(b) by 1611 days.

(21) Appl. No.: 10/559,158

(22) PCT Filed: Jun. 7, 2004

(86) PCT No.: PCT/EP2004/006104
§ 371 (c)(1),
(2), (4) Date: Mar. 28, 2006

(87) PCT Pub. No.: WO2004/107852
PCT Pub. Date: Dec. 16, 2004

(65) Prior Publication Data
US 2006/0191485 A1    Aug. 31, 2006

(30) Foreign Application Priority Data
Jun. 6, 2003 (DE) .................................. 103 25 712

(51) Int. Cl.
*A01J 3/00* (2006.01)
(52) U.S. Cl.
USPC ..................................................... 119/14.02
(58) Field of Classification Search
USPC ...................... 119/14.02, 14.01, 14.18, 14.14
See application file for complete search history.

(56) References Cited

U.S. PATENT DOCUMENTS

| | | | |
|---|---|---|---|
| 3,599,607 A | 8/1971 | Wallick | |
| 5,784,993 A | 7/1998 | Osthues et al. | |
| 6,209,485 B1 * | 4/2001 | van der Lely et al. | 119/14.02 |
| 6,705,247 B1 * | 3/2004 | Heslin et al. | 119/14.02 |
| 6,814,025 B2 * | 11/2004 | Chen et al. | 119/14.01 |
| 7,302,349 B2 * | 11/2007 | Friggens et al. | 702/32 |
| 7,785,267 B2 * | 8/2010 | Francke et al. | 600/551 |

FOREIGN PATENT DOCUMENTS

| | | |
|---|---|---|
| DE | 197 28 415 A1 | 1/1999 |
| DE | 10131443 | 6/2001 |
| DE | 101 31 443 A1 | 1/2003 |
| EP | 1 131 997 A2 | 9/2001 |
| WO | WO 95/07019 | 3/1995 |

OTHER PUBLICATIONS

Marsh, W. E., A. De Vries, J. K. Reneau, and M. L. Kinsel, 1997. Monitoring performance: statistical process control in dairy herd management. Proceedings of the 6th Annual Northeast Dairy Production Medicine Symposium, Syracuse, NY, Apr. 4-6, pp. 34-46.*

(Continued)

Primary Examiner — Kimberly Berona
(74) Attorney, Agent, or Firm — Smith Law Office

(57) ABSTRACT

For the milking of animals, in particular cows, in a milking installation comprising a plurality of milking places, a method and a device are proposed wherein the milk yields extracted during a milking session at some milking places or the characteristics corresponding to the milk yields are determined and evaluated and in particular compared with prognoses as to milk yield or characteristics. These measures allow on the one hand that sufficiently accurate data are provided for herd management while on the other hand the investment cost for a milking installation are reduced.

19 Claims, 1 Drawing Sheet

(56) References Cited

OTHER PUBLICATIONS

De Vries, A., B. Conlin, J. Reneau, M. Kinsel, and W. Marsh, 1997. Some illustrations of the use of statistical process control techniques in monitoring dairy herd performance. Proceedings, 8th International Symposium for Veterinary Epidemiology and Economics. Paris, France, Jul. 8-11. Special issue of Epidemiologie et Sante Animale 31-32:13.11.1-3.*

J Dairy Sci. May 1994;77(5):1285-95. Simulating individual cow milk yield for milking parlor simulation models. Thomas CV, DeLorenzo MA.*

Reneau, Jeffrey, DVM, MS and Lukas, Joanna, MS, Using Statistical Process Control Methods to Improve Herd Performance, Department of Animal Science, University of Minnesota, St. Paul.*

English language Abstract, Translated Description and Claims of DE 101 31 443 A1, European Patent Office's esp@cenet.com database, 5pp.

English language Translated Description and Claims of DE 197 28 415 A1, European Patent Office's esp@cenet.com database, 5pp.

Database Biosis, XP00835507, "A Method for Continuous Automatic Monitoring of Accuracy of Milk Recording Equipment," European Assoc. for Animal Production Publ., 1992, 8pp.

* cited by examiner

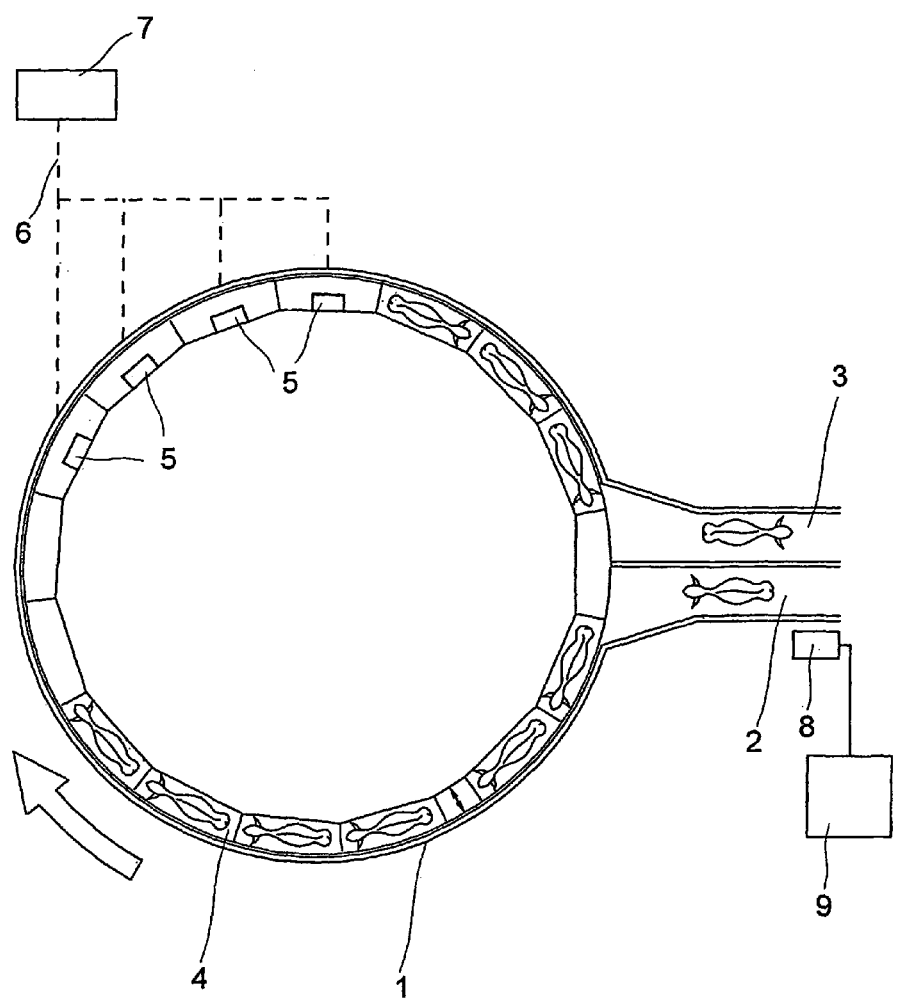

METHOD FOR EXTRACTING MILK AND DETERMINING A GROUP MILK YIELD BASED UPON A SUBGROUP MILK YIELD

FIELD AND BACKGROUND OF THE INVENTION

The object of the invention relates to a method and a device for extracting milk from animals, in particular from cows. However, the invention may also be employed for extracting milk from other dairy animals such as goats, sheep, buffaloes, llamas, camels, dromedaries, yaks, etc.

Developments in the dairy cattle industry toward larger units with more animals and increased milk yields require high management skills from milk producers. Therefore it has been known to increase work productivity with large numbers of dairy cattle by employing milking installations comprising a plurality of milking places. In respect of the configuration of milking installations, a variety of embodiments exist.

WO 95/07019 for example discloses a rotary milking parlor. This is an installation with milking places diagonally offset from one another. This configuration provides the milker with a good view and direct access to the udder. There are also known rotary milking parlors where the animals stand side by side. Such a side by side rotary milking parlor is very much space-saving.

Other than rotary milking parlors, group milking parlors are known with the milking places arranged stationary such as herringbone parlors, drive-through and side by side block parlors, and tandem parlors. Furthermore there exist tie-in stall barns where the individual animals stand in place and the milker moves the milking device from animal to animal.

In the known milking installations comprising a plurality of milking places, each milking place is equipped with a milk yield measuring device. Said milk yield measuring device measures and processes the individual animal data. The measurement results serve to monitor and control the milking session for each individual animal. The data generated such as the milk yield, milk flow and conductivity, are stored in a memory. This equipment used may for instance be the METATRON 21 of the company WestfaliaSurge GmbH.

The amount of data generated by the milk yield measuring device are processed and evaluated in the scope of a herd management and control system. Said evaluation supplies to the manager of the dairy farm economic characteristics as well as data on the state of health of the animals. The manager furthermore receives significant data on previous feeding and also data for a modification of animal feeding if necessary, since the influence of feeding will be obvious within a few days. In the case of undesirable changes the manager can thus react fast, matching the feed type and quantity accordingly. Then again, the accumulated lactation milk yield is a useful measure for the performance of an animal. It is therefore another significant advantage of milk yield measuring that the manager can select the best animals such as for breeding purposes.

Correspondingly the herd system serves to improve performance and health of a herd. The performance and the health of a herd are also tied in with the feed for the individual animals or groups of animals within the herd. The control system or a system for herd management provides corresponding decision tools.

SUMMARY OF THE INVENTION

On the basis of the above, the present invention is directed at improving the known device and the known method so as to achieve a simplified configuration.

The method according to the invention for extracting milk from animals of a total number of animals is distinguished in that the milk yield extracted is automatically determined only for a subgroup of the animals.

It was surprisingly found that for efficient herd management it is not inevitably required to provide data from each individual milking session. A sufficient certainty as regards efficient herd management can be obtained already by providing milking session data only from a subgroup of the total number of animals. This method procedure according to the invention has numerous advantages.

The method according to the invention is in particular suitable for multiple-place milking installations where each milking place is provided with a milking unit. There is the option to provide each milking unit with a flow meter wherein the method according to the invention is carried out by measuring the milk yield obtained in a milking session only from a subgroup of the number of animals.

This method procedure allows to obtain data on the milk yield from specified milking units. In group milking parlors for example which the animals can freely enter the individual animals may seek their favorite place owing to light condition, temperature or air draft or other factors. If there is the option that milking equipment or milking units are chosen where the milk yield is automatically measured, a systematic error can be reduced for example if one or more animals always seek the same milking place for every milking session. When employed in tie-in stall barns where the animals stand in place and the milking device is brought to the animal for milking, individual animals can be explicitly selected and milked with the milk yield being measured while other animals are milked with the milk yield not being measured.

Due to the fact that data are obtained from some of the milking units or milking devices it is not inevitably required that each and every milking unit be equipped with milk yield measuring devices. This will reduce technical installation expenses to a significant extent since the data obtained from the milk yield measuring device must be transmitted e.g. to a data processing unit via signal lines. Moreover, this will reduce the investment cost to the manager of such a milking installation.

If all of the animals are milked in one milking installation in sequence, the total number of animals can be subdivided into at least two subgroups. The individual animals may be arbitrarily assigned to any subgroup. Preferably the individual animals are assigned to subgroups within the total number of animals by specified selection criteria. An animal can for example be assigned to a specified subgroup if the milk yield of this animal had not been measured for some time.

It is also possible to monitor some animals more closely than others in respect of time so as to monitor for example their health status. A sudden drop in the milk yield may for example be an indication of oestrus. For animals where oestrus is expected it may therefore be desirable to monitor the milk yield at shorter intervals as specified according to a specific embodiment of the invention. An automatic sorting of animals may be provided so as to guide the animals to milking places provided with the required equipment. In a preferred embodiment two gates operated in parallel may be provided wherein the gate of an animal whose milk yield is to be measured will remain closed until a suitable milking place is available.

If the total number of animals has been divided into at least two subgroups, the milk yield extracted from the first subgroup may for example be determined automatically without requiring costly intervention by the manager while the milk yield of the second subgroup of animals is not determined. Measuring the milk yield extracted is on the whole performed automatically. Selection of the animals is also preferably automatic in that the animals are for example randomly selected via the milking place or the milking device, or they are for example specifically guided.

According to a preferred embodiment of the method it is proposed to determine the individual milk yield of an animal from at least one of the animals of a subgroup. The advantage of this method procedure is that the milk yield of individual animals can be monitored. A monitoring of the individual milk yield of one animal or a monitoring of the total milk yield allows to draw conclusions from the milk production characteristics of the animals for example if the feeding behavior of individual animals or the feeding procedure are taken into account.

For assessing the performance level of any animal the individual animal data are preferably stored in a memory. The individual animal data may include the milk yield, the animal ID number, the milking time and other data. Other data may include the quarter yield, the duration of milking and for example the behavior of the animal during milking so as to obtain a general picture of an animal. Preferably the milk yield of all the animals or at least substantially all of the animals is monitored by carrying out measurements in specified or statistical intervals.

The method procedure is particularly preferably configured such and the milking installation and the milking equipment equipped such that on average the milk yield of each animal is determined at least once, better twice each month. With two measurements the average error of the estimated monthly milk yield for 60 milking sessions per month will be approximately 12.5%. If a better estimate is required, the average measuring frequency should be increased so as to schedule an average of 3 or 5 or 10 or even 20 or more measurements. With an average of for example 5 milk yield measurements the statistical allowance will be such that the animals with a small or the smallest number of measurements will still be measured at least 2 times as a rule. The estimates obtained from animals measured more often will accordingly be better. Two milking sessions per day and for example 10 measurements per month will result in excellent estimates of milk yield per month.

If the quantity of milk yield measuring units or devices employed is larger than required on a statistical average basis, specific systematic errors can be corrected or avoided. This can be achieved in that the first milking place or a number of milking places in a front section of a group milking parlor are equipped with more measuring units than in a center section. This will enhance accuracy since the hierarchy among the animals may be reflected in particular in the first milking places. Thus the first animal in the hierarchy may for example always stand in the first place. If this place is not equipped for milk yield measuring, the milk yield of this animal will only be measured infrequently or not at all. In a center or back section, the order of succession of the animals will be more random. It may be advantageous to equip two adjacent milking places. More specific embodiments may provide that the rearmost places will not have equipment.

According to a preferred embodiment of the method it is proposed to derive the total milk yield of the total number of animals from the extracted milk yield. A derivation of the total milk yield can be done through estimation or projection. In view of the fact that the milk yield which an animal produces changes during the lactation period, the history or the general curve of the lactation milk yield can be included when deriving the total milk yield. For example if the total number of animals being milked is 120, the data of for example 20 animals may be available. The total milk yield of the total number of animals can be extrapolated from this. The individual lactation status may be taken into account.

In determining the total milk yield and/or the individual milk yield per animal, individual animal data may be included. These may for example be the general or current health status or the lactation status of an animal. The milk producing characteristics of an animal is also influenced by the animal's age, the reproduction status and the number of lactations. The individual animal data also include the milk yields that the animal has produced in the past, the quarter yield and the duration of milking or the time between milking.

According to an advantageous embodiment of the method it is in particular proposed to include the length of time between milking. This preferred embodiment of the method allows to achieve an improved determination of the total milk yield and the daily milk output. The length of time between milking also allow conclusions for feed distribution or feed intake and the trivial feeding behavior in general.

The time between milking, or the time passed since the last milking time, is a significant parameter for estimating the milk yield of an animal per day or per month or in total since with a short time of e.g. 3 hours since the last milking, only a small milk yield can be expected while for example with a 6 hours interval, a much larger milk yield is to be expected. From a certain time interval between two milking sessions, milk will also be reabsorbed such that more time between milking do not necessarily result in a larger milk yield. If the time between milking is taken into account accordingly, the current milk yield extracted will allow dependable conclusions on the daily milk yield.

The genetic conditions of an animal such as the race of the animal count among the individual animal data taken into account when determining the milk yield.

The total milk yield from a cattle herd is influenced by the individual animal milk yields. Milk producing farms will be interested in maintaining a high level of the total milk yield of a herd. Therefore we propose that a measure for accumulated lactation milk yield be derived for at least one animal in a subgroup. This measure may serve as a criterion for deciding whether any one animal should be included in the total number of animals or removed from the milk producing operation.

To determine the current data per diem we propose that a measure or a characteristic for a daily milk yield or a milk yield per week or per month be derived for at least one animal of any subgroup of animals. Said measure or characteristic may serve as an influence quantity for determining the amount of feed and/or composition of feed so as to maintain a high milk yield level.

According to yet another preferred embodiment of the method it is proposed to compare the milk yields determined to milk yield prognoses. This process control allows to initiate a learning process. For example if the milk yield prognoses differ too much from the determined milk yields, the number of animals constituting a subgroup may be increased. If the determined milk yields are exceptionally congruent with milk yield prognoses, the number of animals constituting the subgroup may be reduced.

In this way one can achieve, with little procedural effort and little amount of work, a relatively high reliability in view of the data obtained.

We propose in particular to determine the extracted milk yields or characteristics corresponding to the milk yields for 1 to approximately 75% or more of the total quantity of milking devices or milking units or teat cups. A determination of the milk yields or the characteristics corresponding to the milk yields may in particular be performed for 3 to 33% of the total quantity of milking units. It has been found that the evaluated data are as a rule sufficiently reliable if the data of approximately 8 to 15% or up to 20% of the total quantity of milking units (or teat cups etc.) are determined.

Rotary milking parlors may generally be equipped with a smaller number of places equipped for milk yield measuring since systematic errors due to the succession of the animals are avoided. In group milking parlors it is preferred to equip about 10% more of the milking places or milking units for milk yield measuring.

The number of milking devices or milking places equipped for milk yield measuring is preferably adapted to the other parameters such that a specified quantity of milk yield measuring will be performed each month. With three or four milking sessions per day the number of measuring units may be reduced compared to two milking sessions.

If the milking installation is for example a rotary milking parlor comprising 30 milking units, the extracted milk yield may be measured for example for 10 to 15% of all of the milking units. Given 30 days of operation of the milking installation and two milking sessions per day, each animal will be milked 60 times in total during this period. Taking into account that in this example 10 to 15% of all milking units are utilized for determining the milk yield extracted, an average of six to nine readings per animal will be available. The quantity of available readings for each animal will increase with the operation period. A sufficient number of measured values is available to derive the total milk yield of the herd and to derive the individual animal milk yield of at least one animal.

In a preferred specific embodiment the method according to the invention is carried out such that the milk yields or the characteristics corresponding to the milk yields are measured from randomly selected animals. An active animal selection means that the animals are selected randomly from the total number of animals or the animal herd. A passive animal selection means that each animal from a total number of animals has the option to seek a milking place equipped for milk yield measuring.

Another specific embodiment provides for selecting animals whose milk yield is to be measured. This may be an active or a passive process. To this end it is proposed that the milk yields or the characteristics corresponding to the milk yields of specific animals are determined. For large herds there is the option to arrange a subgroup of animals representative of the total herd and reflecting the herd in respect of their properties.

A combined operation is also feasible where a number of animals are selected or singled out while the milk yield of other animals is measured randomly. This may be useful for example if the milk yield of specific animals is to be monitored more closely.

There is also the possibility to select animals whose data had not been updated for a longer time. A selection device may be provided for this purpose.

Animals, in particular cows, are milked as a rule at least twice a day. Many cows are milked three times a day. To obtain large amounts of data on the yield level of a herd, of a total number of animals, another preferred embodiment of the method proposes to determine the milk yields or the characteristics corresponding to the milk yields of animals during each milking session.

To guarantee a somewhat continuous curve of the milk production of individual animals it may be provided that the milk yields or the characteristics corresponding to the milk yields of at least a number of animals are determined at least twice a day.

According to yet another preferred embodiment of the method it is provided that a group of animals out of a total number of animals is selected whose milk yields or characteristics corresponding to the milk yields are determined over a specified period, in particular of days, weeks or months.

According to yet another preferred embodiment of the method it is proposed to make a comparison of the actually extracted milk yield with milk yield prognoses. In dependence on the result of said comparison, at least one process is initiated. Such process may for example be a feeding process. The amount of feed and/or type of feed and/or composition of feed supplied to the animals is determined on the basis of the comparison of the actual milk yield with the milk yield prognosis. It may be provided that as specific threshold values are exceeded, the animals or animals concerned as to such exceeded threshold values are subjected to monitoring. The milk yield of such animals may be determined in each milking session.

The actual total milk yield is determined in the dairy or can be read off the milk tank. It is therefore preferred to compare the derived total milk yield with the actual total milk yield and in the case of deviations, parameters for deriving the estimated total milk yield are adapted accordingly to enhance the reliability of derivation. A comparison of the extracted milk yield of the control group with the obtained total milk yield is carried out so as to increase the quality of estimates.

It is another object of the invention to improve the known device for extracting milk from animals out of a total number of animals so as to achieve a simplified configuration.

The device of the invention for extracting milk from animals out of a total number of animals comprises a plurality of milking devices and/or milking units. The device is distinguished in that a means is provided which allows to determine the extracted milk yield only from a number of milking places. This configuration of the device according to the invention provides the possibility to automatically determine the extracted milk yield only from a subgroup of animals.

The device preferably comprises measuring units wherein only some of the milking devices and/or milking units and/or teat cups are connected with the measuring units.

Thus a device is provided by means of which data are supplied with relatively minor technical efforts which data are a sufficiently reliable reflection of the properties of the total number of animals.

According to a preferred embodiment of the device it is proposed to provide a control means. The control means serves to control the milking process. The control means may for example block or release milking places or initiate other processes.

A selection device may be provided. Said selection device may comprise a random generator. The random generator randomly selects animals from the total number of animals. These animals are given the option of accessing milking places equipped with a measuring unit for determining the milk yield extracted during a milking session. Said selection device may be configured such that it selects animals or groups of animals which meet specified selection criteria. These may for example be animals who are overdue for having their milk yield measured. Said selection device and control device may be connected with one another. In this case the selection device will transmit signals to the control means and/or vice versa.

The device preferably comprises identification means. Said identification means may interact with the selection device and/or a milking place or some or all of the milking places. The identification means at the entrance to a milking place and a corresponding gate circuit or selection may provide an animal with the option to seek a milking place equipped for milk yield measuring. The control means may open a corresponding gate for this purpose. The animal will then enter the milking place having a milking device provided with a means for measuring the milk extracted during a milking session. An identification may be provided at the milking place so as to store in a memory the animal and the time of milking.

The selection means and the control means may operate independent of one another for example when both the selection means and the milking place comprise an animal identification means.

The selection means may influence the sequence in which the animals are milked. This measure may reduce a systematic error caused by the fact that for example in group milking parlors, certain animals will seek favorite places.

An embodiment where the device comprises a total number of milking places, only a first type of milking places (or milking devices) is provided with a milk yield measuring device each, while a second type is not provided with measuring units. The first type is provided in a specified first quantity and the second type in a specified second quantity. The sum of the first quantity and the second quantity corresponds to the total quantity of milking places or milking devices.

In this embodiment, the device according to the invention comprises a control device which enables the device to derive, only from the measuring data obtained from the first type of milking places, an estimate for the total milk yield representing the total milk yield extracted at the milking places of the first and the second type. For this purpose the control means comprises a memory to store the animals milked at the first milking place type and their milk yield and the animals milked at the second milking place type. An extrapolation from the data allows to estimate the total milk yield.

A continuing operation will in particular allow to derive a measure for the individual lactation milk yields of all of the animals so as to determine the performance of the animals.

Preferably the number of the second-type milking places (second quantity) is larger than the number of the first-type milking places (first quantity) and particularly preferred it is two or three times as large as said first quantity.

Specific embodiments of the device according to the invention may be provided to include individual, several or all of the embodiments described above with reference to the method of the invention.

Other details and advantages of the method and the device for milking animals, in particular cows, will be described with reference to the embodiment illustrated in the drawing wherein the object of this invention is not limited to the specific embodiment.

BRIEF DESCRIPTION OF THE PREFERRED EMBODIMENT

Reference numeral 1 in the FIGURE designates a rotary milking parlor comprising an entrance 2 and an exit 3. The rotary milking parlor comprises a plurality of milking places 4. Some of the milking places 4 are provided with measuring units 5 for measuring the milk extracted during a milking session. The illustrated embodiment provides the measuring units 5 positioned at milking places 4 arranged one behind the other. This is not inevitably necessary. The measuring units may be distributed, for example evenly distributed.

The rotary milking parlor in the illustrated embodiment comprises 16 milking places. Five of the 16 milking places are provided with measuring units 5 for measuring the milk extracted during a milking session. This corresponds to a covering of approximately 30%. The number of units or milking places equipped for measuring and evaluating the milk yields extracted during a milking session may be smaller, preferably between 10 and 15%.

The measuring units 5 are connected with a control means 7 via data lines 6. A wireless connection is conceivable. There is the option that the data from the devices are for example transmitted to the control means 7 in the form of radio signals. The control means 7 is provided with at least one evaluation unit which is for example a processor or a computer.

The evaluation unit serves to evaluate and store the data obtained through the measuring units 5. Preferably the milk yield per day is estimated, factoring in the hours between milking such that the milk yield itself or the estimated milk yield per day is accumulated. One embodiment provides for the data to be compared with data prognoses. This embodiment provides that in dependence on the result of the comparison other processes may be initiated. For example the quantity of feed may be increased or reduced in dependence on the evaluation result, or the feed type may be changed, in particular if the data evaluated differ much from the data prognoses or data desired over a long period of time.

An identification means 8 is arranged in the area of the entrance 2. The identification means 8 serves to identify the animal entering the rotary milking parlor through the entrance 2. The identification means 8 is connected with a selection means 9. Said selection means 9 and said identification means 8 in conjunction with the control means 7 may be connected with sorting means (not shown) which either block or unblock the entrance 2 for occupancy of the milking places 4 which comprise the measuring units 5. A simple embodiment has a sorting means comprising two controllable gates arranged in parallel and controllable separately such that the waiting animals part into the two separate corridors in front of the gates. If an animal whose milk yield is to be measured is standing in front of the first gate, the corresponding gate may remain closed until the next milking place to be occupied comprises a measuring unit.

According to the proposal of the invention the milk yield extracted during a milking session is measured only at some of the milking places. The data collected are sufficiently accurate so as to obtain a statement on the yield capacity of the herd and the individual animals so as to allow a selection for breeding purposes or for modifying the feeding. The equipment required for realizing the invention is relatively small in number, thus improving the cost effectiveness of such an installation.

If the invention is modified accordingly, it may be employed, instead of for milk yield measuring, for sampling so as to automate the taking of milk samples. For this purpose, only a few milking devices or milking units or milking places may be equipped with a sampling means where samples will be taken automatically. This may be performed exactly as described herein wherein, although milk yield measuring of individual animals is not necessary, it may be provided. The applicant mentions at this point that they reserve the right to request separate protection for such a sampling system. The invention may further be employed, being modified accordingly, in examining milk constituents such as for example fat or protein, or for evaluating status of health.

The invention claimed is:

1. A method for determining milk yield for a group of dairy animals, the method comprising the steps of:

providing a milking parlor with a group of milking stalls for milking a group of animals;

providing a plurality of measuring devices in a subgroup of said group of milking stalls, the number of milking stalls in the subgroup being less than the number of milking stalls in the group, such that some of the group of milking stalls have measuring devices and some of the group of milking stalls do not have measuring devices;

milking the dairy animals in the group of milking stalls, wherein the dairy animals being milked within the subgroup of milking stalls define a subgroup of animals;

identifying dairy animals being milked in the subgroup of milking stalls; obtaining a milk yield for the diary animals in the subgroup of animals from the measuring devices;

storing the milk yield for the subgroup of animals in a control device; and operating the control device to calculate a milk yield for the group of dairy animals using the subgroup milk yield as a factor.

2. The method according to claim 1, wherein the step of operating the control device to calculate a milk yield for the group of dairy animals is derived from an actual quantity of milk yield extracted from the subgroup of animals.

3. The method according to claim 1, and further comprising the steps of:
determining a milk yield of an individual animal from the subgroup of animals; and
operating the control device to calculate a milk yield for the group of dairy animals using the individual animal's milk yield as a factor.

4. The method according to claim 3, and further comprising the step of:
identifying an animal of the subgroup that is representative of the subgroup.

5. The method according to claim 3, and further comprising the step of:
storing individual animal data to be used as factors in calculating milk yield for the subgroup in the control device.

6. The method according to claim 5, wherein individual animal data are used as a factor in determining the milk yield for the group of dairy animals.

7. The method according to claim 1, and further comprising the step of:
deriving a measure for accumulated lactation milk yield for at least one animal of the subgroup of animals to be used in calculating a milk yield for the subgroup of dairy animals.

8. The method according to claim 1, and further comprising the step of:
deriving a measure for a milk yield from a plurality of milkings for at least one animal of the subgroup of animals.

9. The method according to claim 1, and further comprising the steps of:
calculating the length of time between milkings; and
using the length of time between milkings as a factor in determining a milk yield for the subgroup of dairy animals.

10. The method according to claim 1, and further comprising the steps of:
comparing a milk yield prognoses with the milk yield determined for the subgroup of animals; and
using the comparison as a factor in calculating a milk yield for the group of dairy animals.

11. The method according to claim 1, wherein the step of milking the subgroup of animals comprises the step of:
milking the subgroup of animals with milking devices that number from between about 1% and about 75%, of the total number of milking devices used to milk the group.

12. The method according to claim 1 wherein the step of selecting a subgroup of animals comprises the step of:
selecting dairy animals randomly from the group.

13. The method according to claim 1, wherein the step of selecting a subgroup of animals comprises the step of:
selecting specific animals known to be representative of the subgroup of dairy animals.

14. The method according to claim 1, and further comprising the steps of:
selecting a second subgroup of animals that does not include any dairy animals from the subgroup of dairy animals;
milking the second subgroup of animals with milking devices to determine a milk yield during a second milking session for the second subgroup which were not determined during a first milking session; and
operating the control device to calculate a milk yield for the group of animals using the milk yields from the second milking session.

15. The method according to claim 1, wherein the step of selecting a subgroup of dairy animals, comprises the step of:
selecting animals for the subgroup based on each animal's milk yields over time.

16. The method according to claim 1, and further comprising the steps of:
comparing the actual milk yield of the subgroup with a milk yield prognoses result of said comparison; and
initiating at least one dairy process as a result of said comparison.

17. The method according to claim 14, wherein the step of milking the second subgroup of animals with milking devices comprises the step of:
milking the second subgroup with milking devices that number from between about 2% and about 50% of the total number of milking devices used to milk the dairy animals in the group.

18. The method according to claim 1, wherein the step of milking the subgroup of animals with milking devices comprises the step of:
milking the subgroup of animals with milking devices that number from between about 3% and about 20% of the total number of milking devices used to milk the dairy animals in the group.

19. A method for determining milk yield for a group of dairy animals, the method comprising the steps of:
providing a milking parlor with a first number of milking stalls;
providing a plurality of measuring devices in only a second number of milking stalls, and the second number is smaller than the first number so that some of the milking stalls have measuring devices and some of the milking stalls do not have measuring devices;
milking dairy animals in milking stalls having measuring devices and in milking stalls not having measuring devices;
identifying dairy animals being milked in dairy stalls having measuring devices;
using the measuring devices to obtain milk data from corresponding dairy animals;
transmitting the milk data to a controller for comparison with historical milk data about the corresponding dairy animals; and using the controller to compare the milk data with the historical milk data about the corresponding dairy animals to derive an estimated milk yield for dairy animals milked in milking stalls not having measuring devices.

* * * * *

UNITED STATES PATENT AND TRADEMARK OFFICE
CERTIFICATE OF CORRECTION

PATENT NO. : 8,567,343 B2
APPLICATION NO. : 10/559158
DATED : October 29, 2013
INVENTOR(S) : Francke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1851 days.

Signed and Sealed this
Twenty-third Day of May, 2017

Michelle K. Lee
*Director of the United States Patent and Trademark Office*